March 17, 1953 F. I. STOVALL ET AL 2,631,389
SUBSOIL TUNNEL FORMING DEVICE
Filed June 27, 1949 4 Sheets-Sheet 1
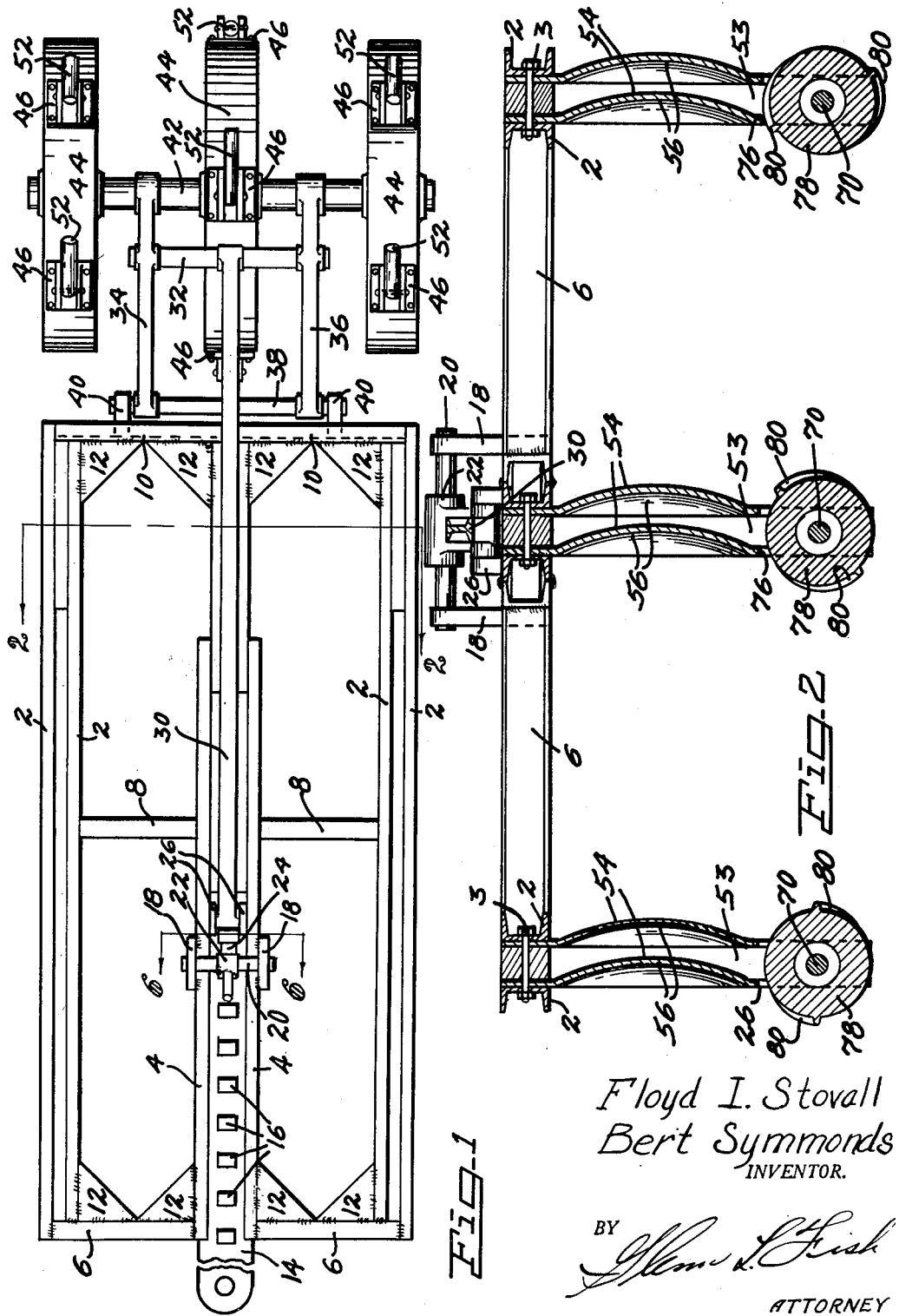
Floyd I. Stovall
Bert Symmonds
INVENTOR.
BY
ATTORNEY

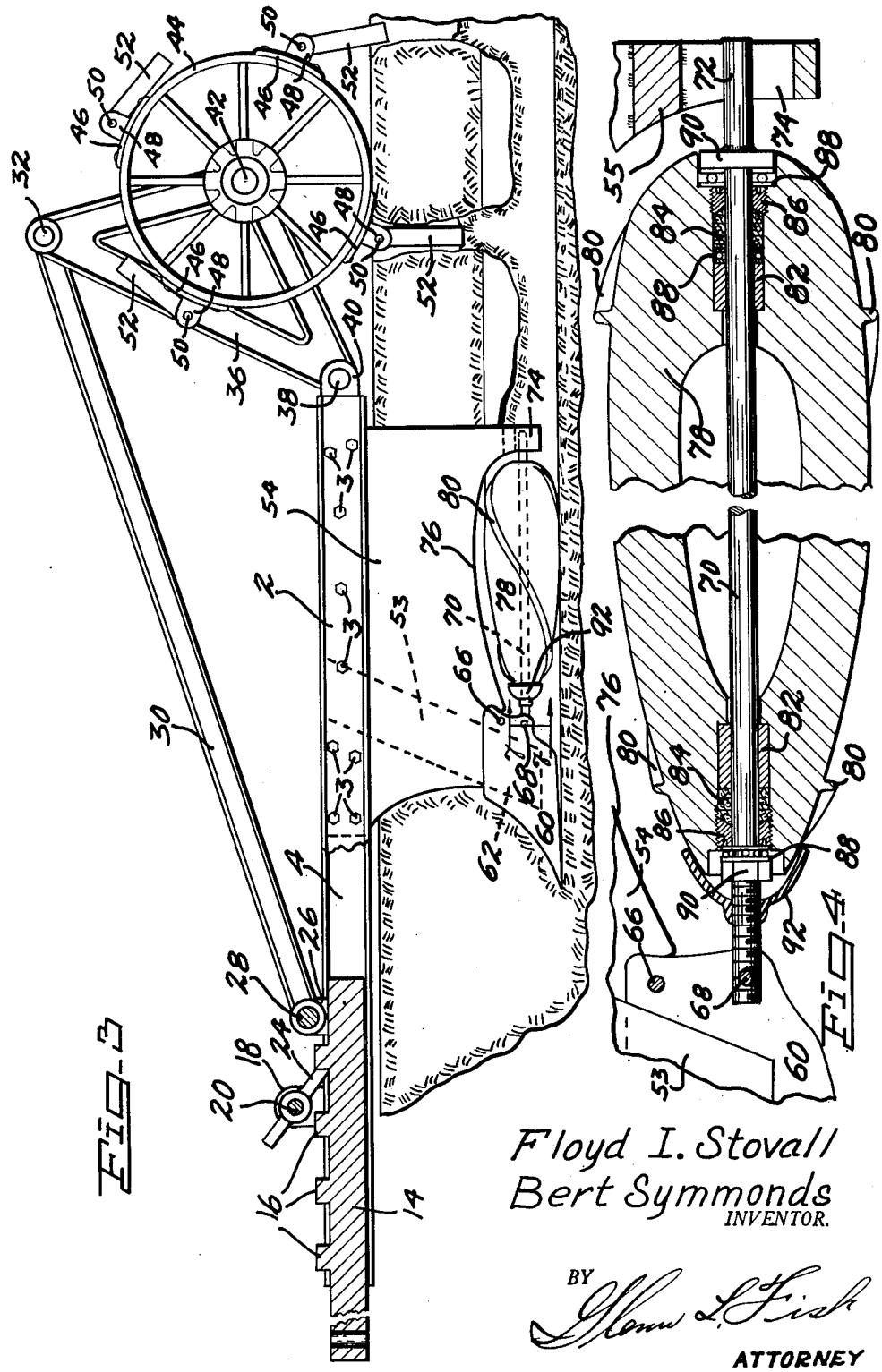

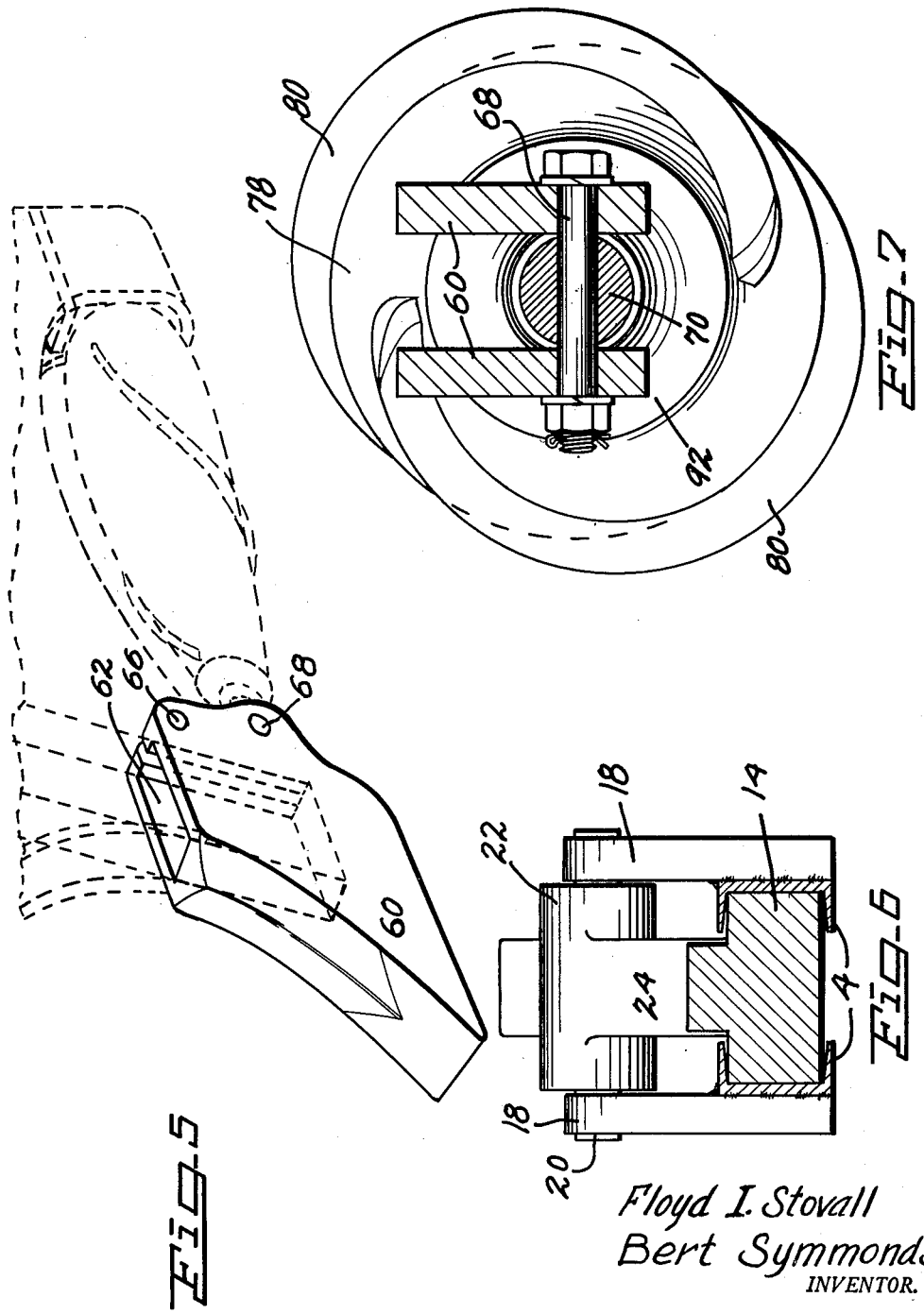

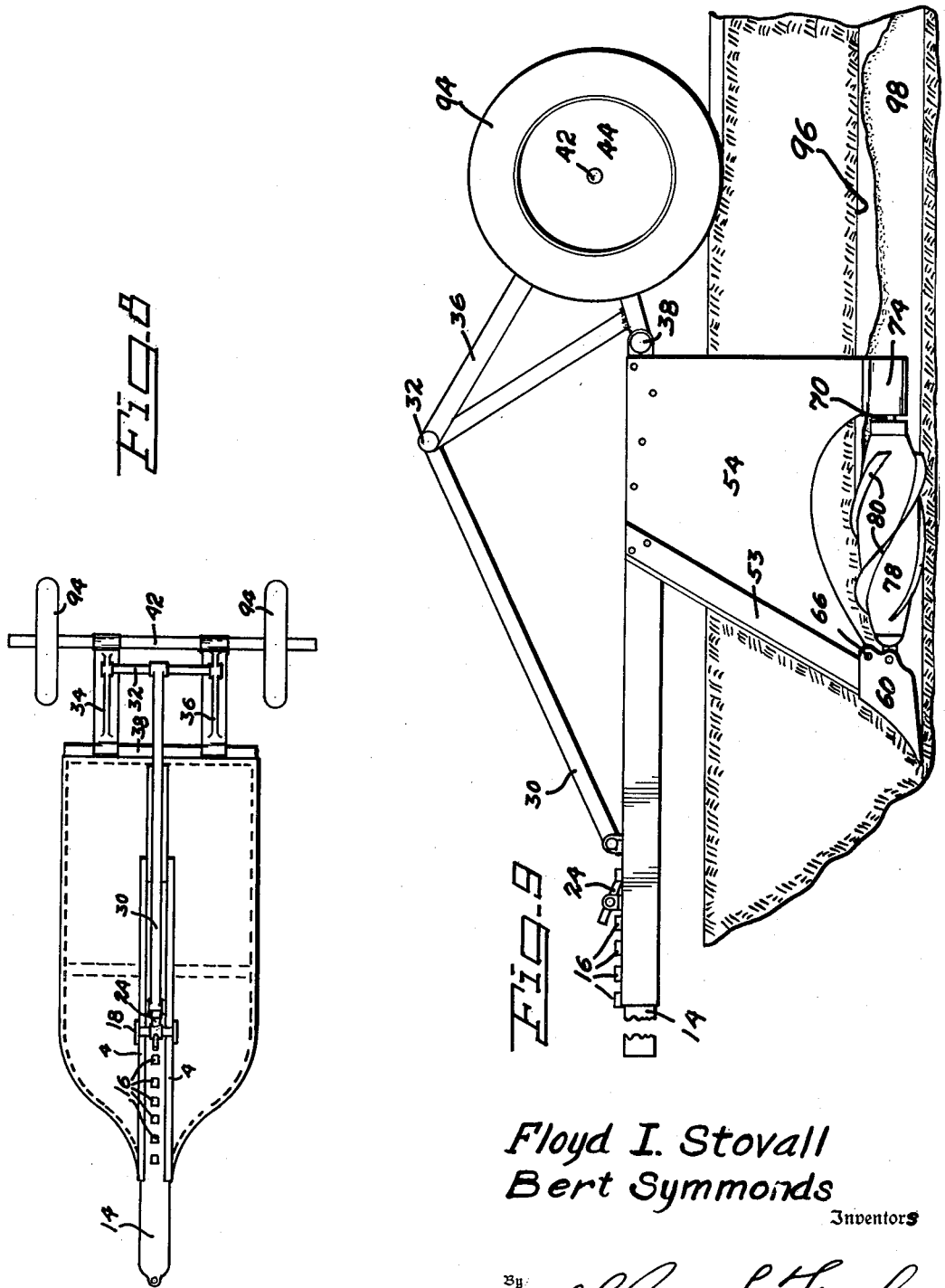

Patented Mar. 17, 1953

2,631,389

UNITED STATES PATENT OFFICE 2,631,389

SUBSOIL TUNNEL FORMING DEVICE

Floyd I. Stovall and Bert Symmonds, Waitsburg, Wash., assignors to S & S Manufacturing Company, Waitsburg, Wash.

Application June 27, 1949, Serial No. 101,516

2 Claims. (Cl. 37—193)

Our present invention relates to an improved sub-soil tunnel forming device of the type adapted to be drawn over the surface of the ground and having sub-surface implements designed to form tunnels below the plow depth to create water reservoirs to collect and retain moisture from rains seeping through the soil.

The tunnel forming implements carried by a suitable frame move through the earth at a depth of approximately four feet while compactors move through the soil above the tunnel formers, and pistons descend through the soil above the tunnel formers and to the rear thereof to close the tunnels at spaced intervals.

The wheeled carriage for the elements has suitable elevating and lowering apparatus and it may easily be drawn from field to field to either cultivate the sub-soil to form tunnels closed at intervals, or it may be used to create unobstructed tunnels for water storage or to allow run-off of the water when desired to facilitate drainage.

In the accompanying drawings we have illustrated one complete example of the physical embodiment of our invention according to the best mode we have thus far devised but it will be understood that various changes and alterations may be made in the exemplified structure within the scope of the appended claims.

In the drawings:

Figure 1 is a top plan view of our invention.

Figure 2 is a vertical sectional view at line 2—2 of Fig. 1.

Figure 3 is a side elevational view showing the device in operating position.

Figure 4 is an enlarged sectional view of the tunnel former.

Figure 5 is a perspective view of the ground breaking foot.

Figure 6 is a sectional view at line 6—6 of Figure 1.

Figure 7 is a sectional view at line 7—7 of Figure 3.

Figure 8 is a top plan view of a modified form of our invention.

Figure 9 is a side elevational view thereof.

Referring now to the drawings wherein we have illustrated the present preferred embodiment of our invention, we use a carriage frame consisting of pairs of channel form side rails 2 secured as by bolts 3 and having spaced aligned center rails 4 with a front end bar 6, central braces 8 and a rear rail 10. Gussets 12 are positioned in the corners of the frame to add strength thereto.

To provide for moving the carriage, as by a tractor or other suitable appliance, we employ a draw bar 14 slidable in the spaced center rails 4 and formed with upstanding lugs 16.

Ears 18 on the rails 4 journal a shaft 20 having a collar 22 and a dog 24 engageable with the lugs 16 and in the ears 26 on the draw bar 14 we journal a shaft 28 to which is pivotally secured a link 30. Thus the draw bar and link are slidable longitudinally with relation to the frame and the selected position thereof may be secured by positioning the dog 24 against a lug 16.

The rear end of the link 30 is pivotally secured on shaft 32 located in an angle of the triangular frames 34 and 36 which frames are pivotally secured to the main frame by means of shaft 38 in a second angle of said frames which shaft is secured in ears 40 on the rear end bar or rail 10. Axles 42 in the third angle of the frames 34 and 36 carry wheels 44 having at spaced peripheral points plates 46 formed with ears 48 for the pins 50 supporting rods or plungers 52. As the wheels revolve the plungers fall by gravity to vertical position and are forced into the ground as best seen in Figure 3.

Also secured by bolts 3 and depending from the side and center rails we employ legs 53 and plates 54 on the sides of the legs which plates are dished at 56. The lower ends of the legs fit into the ground breaking shoes 60 having sockets 62 into which the legs fit. These shoes are clamped to the legs 53 by bolt 66 and the plates 54 are welded or otherwise secured to the legs. At 68 we provide a pivot pin for the shaft 70 the rear end 72 of which floats freely in the eye 74 formed by looping the rear end of plates 54, and providing a spacer 55 therebetween to control the upward movement of the shaft portion 72.

The plates 54 are formed with central recesses 76 to allow the hollow formers 78 to fit therein and these formers have exterior ribs 80 thereon spirally arranged to cause the formers to rotate on shaft 70 as they are drawn through the sub-soil.

The formers are secured to the shaft as by bushings 82 and packing 84 confined by packing nuts 86 and the thrust bearings 88 and collars or nuts 90 retain the formers on the shaft in freely rotatable position. The front bearing is protected by a shield 92.

The formers are substantially tear-drop shaped and following the shoes 60 which breaks the ground, the formers will form tunnels through the earth as the plates 54 compact the soil thereabove, and the plungers 50 will successively close the tunnels at spaced intervals. These closed tunnel sections will receive, collect and retain moisture seeping through the earth and will hold the water until the upper area dries and the moisture is absorbed.

In Figures 8 and 9 we have illustrated a modification of out invention wherein the wheels 44 have tires 94 rather than the plungers and as the tunnel former passes through the earth the unobstructed tunnel 96 is created which will collect water seeping therein but will not retain it if the tunnels are extending down a hill and will allow it to run off into suitable drainage channels or ditches thereby preventing erosion of the soil. If tunnels are formed to follow the contour of the ground, the water will be absorbed and stored in the loose dirt 98.

By the use of our invention, sub-soil cultivation may be accomplished well below the normal plowing depth and conservation of moisture with the attendant crop improvement will readily follow.

Having thus fully described our invention what we claim as new and desire to secure by Letters Patent is:

1. A sub-soil cultivator comprising a main frame and a rear pivotally connected wheeled frame, and means for varying the height of the main frame with relation to the ground including an adjustable link between the frames, legs depending at an angle from the frame, spaced earth compacting plates on and depending from the main frame, ground breaking shoes on the legs, a shaft pivotally and non-rotatably mounted on the rear of the shoe and extending rearwardly therefrom, a guide loop below the rear portion of the plates forming a floating support for the free end of the shaft, and a tunnel former rotatably mounted on the shaft and tapered towards its front end, and exterior spiral ribs on the tunnel former whereby forward movement of the body will rotate the same.

2. A sub-soil cultivator comprising a main frame and a rear pivotally connected wheeled frame, and means for varying the height of the main frame with relation to the ground including an adjustable link between the main frame and the wheeled frame, legs depending at an angle from the frame, spaced concavo-convex earth compacting plates depending from the main frame and having lower edges formed with recesses, a ground breaking shoe on each leg, a shaft pivotally and non-rotatably mounted on and extending rearwardly from the rear end of each shoe, enlarged guide loops below the rear portion of the plates forming a floating support for the free end of each shaft, a hollow tunnel former rotatably mounted on each shaft, and means on the tunnel former responsive to forward movement thereof to rotate the tunnel former.

FLOYD I. STOVALL.
BERT SYMMONDS.

REFERENCES CITED

The following references are of record in the file of this patent:

UNITED STATES PATENTS

| Number | Name | Date |
| --- | --- | --- |
| 25,649 | Hussey et al. | Oct. 4, 1859 |
| 29,269 | Hodgson | July 24, 1860 |
| 189,667 | Snyder | Apr. 17, 1877 |
| 1,314,279 | McCrary | Aug. 26, 1919 |
| 1,373,374 | Walton | Mar. 29, 1921 |
| 1,475,879 | Reynolds | Nov. 27, 1923 |
| 1,840,939 | Dukelow | Jan. 12, 1932 |
| 2,139,306 | Gaffney | Dec. 6, 1938 |
| 2,501,062 | LeTourneau | Mar. 21, 1950 |

FOREIGN PATENTS

| Number | Country | Date |
| --- | --- | --- |
| 395,399 | France | Dec. 28, 1908 |